United States Patent Office 3,475,955
Patented Nov. 4, 1969

3,475,955
COUNTING APPARATUS
Stanley Thomas Long, Rochester, Kent, England, assignor to C.A.V. Limited, London, England, a British company
Filed Jan. 13, 1967, Ser. No. 609,097
Int. Cl. G01m *19/00, 15/00*
U.S. Cl. 73—168                                                    1 Claim

ABSTRACT OF THE DISCLOSURE

Counting apparatus for indicating when a drive shaft has partaken of a number of turns and including a step-up drive unit and a disc driven by the drive unit through a friction drive, the disc having a projection thereon by which movement of the disc is prevented when the projection contacts a stop, the projection and stop forming part of an electric circuit which is temporarily broken whilst the stop is moved out of the path of the projection, to permit the disc to rotate, the circuit being completed when the stop makes contact with the projection after one revolution of the disc.

---

This invention relates to counting apparatus for providing an indication when a rotary shaft has moved through a predetermined angle and has for its object to provide such an apparatus in a simple and convenient form.

Apparatus in accordance with the invention comprises, in combination, a driven shaft which is arranged to be driven through a drive unit of predetermined ratio by the rotary shaft, a member frictionally engaged with said driven shaft, a projection on said member, arresting mechanism mounted adjacent said member and including a movable stop positioned in the path of said projection, said stop and projection forming part of an electrical circuit for providing an indication when the stop and projection are in contact with each other and the arrangement being such that, in use, the stop is momentarily moved out of the path of the projection thereby breaking the electrical circuit therebetween and allowing the member to move with the driven shaft, the stop then being moved into the path of the projection so that when the rotary shaft has moved through a predetermined angle as determined by the ratio of the drive unit, the stop will re-engage the projection to complete the electrical circuit.

Figure 1:
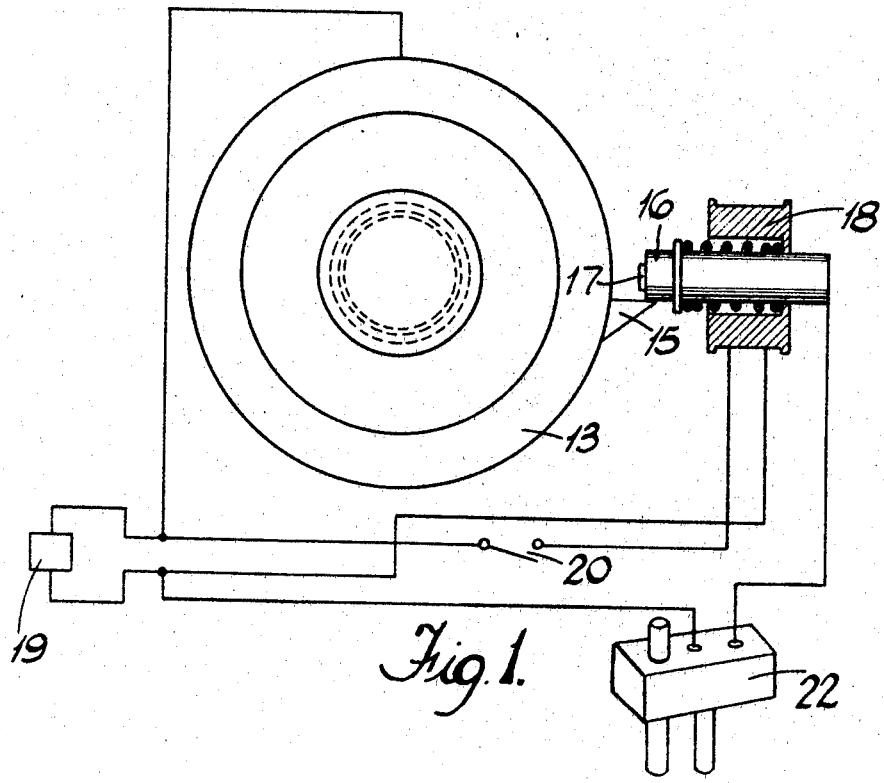
Figure 2:
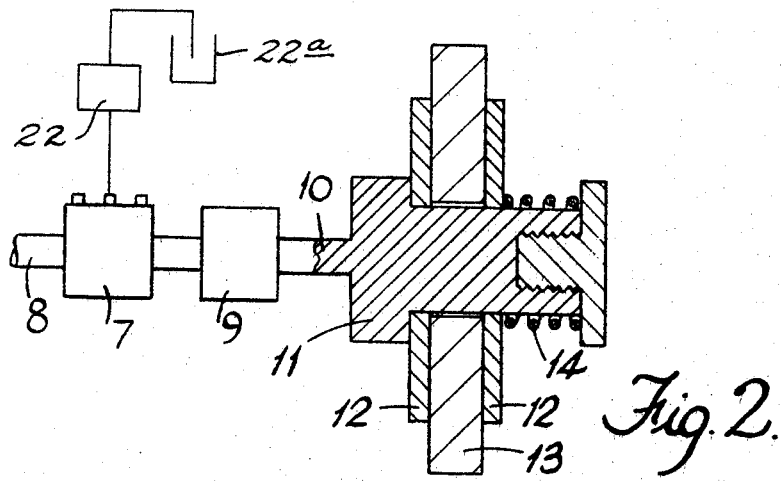

One application for a counting apparatus in accordance with the invention exists when it is required to test liquid fuel supply pumps to see that, for a predetermined number of revolutions of the pump, the correct quantity of fuel is delivered by the pump. In carrying out this test the pump is driven and the quantity of fuel delivered by the pump whilst the latter is partaking of a predetermined number of revolutions is collected. For this purpose, the pump is driven by a rotary shaft and a solenoid operable valve is provided which when the solenoid is de-energized diverts the output of the pump to a measuring jar. The application will be described with reference to the accompanying drawings in which:

FIGURE 1 is a diagrammatic view of apparatus in accordance with the invention and FIGURE 2 is a side elevation of part of the apparatus shown in FIGURE 1.

The counting apparatus comprises a driven shaft 10 which is driven by a rotary shaft 8 through a reduction gearbox 9 of predetermined ratio, the rotary shaft 8 also driving a fuel pump 7. Formed on the driven shaft is a collar 11 against which is located a pair of discs 12 of friction material arranged to rotate with the shaft. Further provided on the driven shaft and located between the discs 12 is an electrically conductive member 13 of disc like form. The discs are loaded by a spring 14 towards the collar with the result that the member will be rotated by the shaft but can be prevented from so doing when required.

Formed on the external periphery of the member is a projection 15 having a leading edge disposed radially relative to the axis of rotation of the driven shaft and disposed adjacent to the member is an arresting mechanism which includes a movable and electrically conducting stop 16 having an electrically insulated tip 17. The stop is formed by a spring loaded armature which is loaded into a position to intercept the projection 15. The solenoid winding 18 is connectible to a source of electric supply 19 through a normally open switch 20 and the solenoid operable valve 22, and a switch constituted by the projection 15 and the stop 16, are also connected in series with the supply.

The arrangement is such that initially the rotary shaft 8 drives the pump 7, and the solenoid operable valve 22 is energised to divert the output of the pump to a drain, the solenoid operable valve being energised via the projection 15 and the stop 16. When it is required to check the output of the pump the switch 20 operated to energise the solenoid 18 and the stop 16 is moved away from the projection 15 to allow the member 13 to move with the driven shaft. Thus the solenoid operable valve 22 is de-energised to divert the output of the pump to a measuring jar 22a. The normally open switch 20 is of the delayed action type so that the stop is held clear of the trailing face of the projection.

The member 13 moves angularly one complete turn until the projection again strike the stop to close the switch constituted by projection 15 and stop 16 and by this means the solenoid valve is re-energised to divert fuel from the pump to drain. The number of revolutions of the pump during the period of one revolution of the member is determined by the reduction ratio of the gear box and knowing this ratio and the quantity of fuel delivered by the pump the amount of fuel delivered by the pump per revolution may be calculated.

Apparatus as described has proved to be very reliable and one of the main reasons for this is that the same surface of the projection is used for initiating and terminating the counting period.

It will be appreciated that apparatus as described may be used when it is required to measure part revolutions of the rotary shaft and in this case the reduction gear box would be replaced by a step-up gear box.

Having thus described my invention what I claim as new and desire to secure by Letters Patent is:

1. Apparatus for use when testing a liquid supply pump and comprising in combination a rotary shaft to which a drive shaft of the pump can be connected, a drive unit of predetermined speed ratio, a driven shaft coupled to said rotary shaft through said drive unit, a member frictionally engaged with said driven shaft, a projection on said member, arresting mechanism mounted adjacent said member and including a movable stop positioned in the path of said projection, said stop and projection being formed from electrically conductive material and constituting an electric switch, a solenoid operable valve for controlling liquid flow from said pump to a measuring jar, the solenoid of said valve being included in an electric circuit with said switch, and means operable to withdraw said stop out of the path of said projection thereby to allow movement of the member and simultaneous operation of the solenoid valve to allow the pump to discharge into the measuring jar, said means being subsequently operable to release said stop into the path of the projection to enable the solenoid valve to operate to divert the pump output from the measuring jar when the projection contacts the stop.

References Cited

UNITED STATES PATENTS 2,795,950 6/1957 Liddell _____ 73—168 XR
3,367,176 2/1968 Emerson _____ 73—168 XR

FOREIGN PATENTS 702,375 1/1954 Great Britain.
775,586 5/1957 Great Britain.

LOUIS R. PRINCE, Primary Examiner
J. NOLTON, Assistant Examiner

U.S. Cl. X.R.

73—119